United States Patent [19]

Cameron et al.

[11] Patent Number: 4,983,690

[45] Date of Patent: Jan. 8, 1991

[54] CONDUCTIVE POLYMER-MALEIMIDE BLENDS AND METHOD OF PRODUCING SAME

[75] Inventors: Randy E. Cameron, Pacific Palisades; Abraham L. Landis, Northridge, both of Calif.

[73] Assignee: Lockheed Corporation, Calabasas, Calif.

[21] Appl. No.: 325,724

[22] Filed: Mar. 20, 1989

Related U.S. Application Data

[63] Continuation-in-part of Ser. No. 158,478, Feb. 22, 1988, Pat. No. 4,855,361.

[51] Int. Cl.$^5$ .......................... C08L 19/08; H01B 1/00
[52] U.S. Cl. ..................................... 525/436; 252/500; 252/511; 525/540
[58] Field of Search ................ 525/436, 540; 252/500, 252/511

[56] References Cited

U.S. PATENT DOCUMENTS 3,766,117 10/1973 McQuade .
4,526,706 7/1985 Upson .
4,692,225 9/1987 Wituki et al. ........................ 428/265
4,855,361 7/1989 Yaniger et al. ...................... 525/546

FOREIGN PATENT DOCUMENTS 1519729 2/1968 France .

OTHER PUBLICATIONS

A. G. MacDiarmid et al., Mol. Cryst. Liq. Cryst., 121, 173 (1985).

*Primary Examiner*—Allan M. Lieberman
*Attorney, Agent, or Firm*—Max Geldin

[57] ABSTRACT

Solution blending of (a) a conductive polymer containing carbon-nitrogen linkages, such as polyaniline, having an organic group or an inorganic group, e.g., derived from an anhydride or an aromatic multisulfonic acid, covalently linked to nitrogen atoms of the polymer and (b) a malemide, particularly a bismalemide, e.g., the bismaleimide prepared by reacting 1,3 bis (3 aminophenoxybenzene) with 2 units of maleic anhydride, or a bismaleimide terminated oligomer, in a suitable solvent. On removal of solvent and heating to cure the bismaleimide, a continuous phase blend of the conductive polymer and the bismaleimide is formed, having good electrical conductivity and strength. The solution blend can be applied as a coating on a substrate or can be processed to a powder which can be compressed into parts. The conductive blend can be melted and cured without the evolution of volatiles.

32 Claims, No Drawings

CONDUCTIVE POLYMER-MALEIMIDE BLENDS AND METHOD OF PRODUCING SAME

BACKGROUND OF THE INVENTION

This application is a continuation-in-part of U.S. application Ser. No. 158,478, filed Feb. 22, 1988, of Stuart I. Yaniger and Randy E. Cameron, and assigned to the same Assignee as the present application.

This invention relates to the production of electrically conductive polymer materials and is particularly concerned with the solution blending of conductive polyaniline and conductive polyaniline derivatives, with maleimide systems, particularly bismaleimide, to produce cured maleimide materials having electrical conductivity, without decreasing the mechanical properties of the maleimide component.

The free-base form of polyaniline is believed to comprise subunits having the formula:

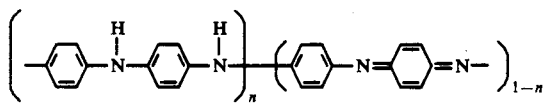

where n is between 0 and 1. The oxidation state of polyaniline referred to as "emeraldine" is believed to have a value of n of about 0.5.

This free-base form of polyaniline is an electrical insulator. Reaction of emeraldine free-base with protonic acids of the form HX, where X is, for example, Cl, causes the polymer to undergo an insulator to conductor transition, as disclosed in A. G. MacDiarmid, et al, Mol. Cryst. Liq. Cryst. 121, 173 (1985). Conductive polyaniline of this type has been employed in batteries as disclosed, for example, in French Patent No. 1,519,729.

However, a number of difficulties have been encountered with the prior art materials noted above. Thus, the conductive polyaniline acid salts are, with a few exceptions, insoluble in most solvent media. None of the polyanilines can be melted. The emeraldine free-base and the conductive forms thereof noted above tend to form powders on removal of the solvent. With some effort, films can be cast; however, they are quite fragile and brittle, easily crumbling to form a powder. The conductive acid salts lose their conductivity when exposed to liquid water. This loss is due to deprotonation. The conductivity loss is reversible; treatment of the deprotonated material with protic acids restores the conductivity. Further, conductive regions in an insulating matrix tend toward diffusion. For example, if one makes a conductive trace of polyaniline acid salt on a substrate of emeraldine free-base, the trace remains spatially stable for only a short time, eventually spreading out until the substrate has a constant conductivity throughout.

Some of these problems were addressed in U.S. applications Ser. No. 920,474 filed Oct. 20, 1986, of S. I. Yaniger, and Serial No. 013,305 filed February 11, 1987, of S. I. Yaniger, et al, both assigned to the same assignee as the present application. In these applications, it is disclosed that Lewis acids, for example, alkylating agents, can be used to make the insulating emeraldine free-base into a conductive polymer salt. Use of proper Lewis acids resulted in conductive polyanilines with the Lewis acid as a side chain. These derivatized polyanilines are more water stable and processable than the prior art emeraldine acid salts. Additionally, no diffusion between "doped" conducting and "undoped" insulating regions was observed.

Thus, in the above U.S. application, Ser. No. 920,474, a base-type non-conductive polymer, such as polyaniline, can be reacted with, for example, methyl iodide, to form an electrically conductive polymer in which the methyl group is covalently linked to the nitrogen atoms of the polymer.

In the above U.S. application, Ser. No. 013,305, emeraldine free-base can be reacted with reagents of the form $RSO_2Cl$, e.g., tosyl chloride, to form an electrically conductive polymer in which the $—SO_2R$ groups are covalently linked to the nitrogen atoms of the polymer.

U.S. application Ser. No. 158,477 filed Feb. 22, 1988, of S. I. Yaniger and R. E. Cameron and assigned to the same assignee as the present application, discloses reaction of a base-type non-conductive polymer, such as polyaniline, with an anhydride, such as tosylic anhydride or benzophenone tetracarboxylic dianhydride, and forming an electrically conductive polymer in which the $—SO_2R$ and $—COR$ groups are covalently linked to the nitrogen atoms of the conductive polymer.

In general, however, the conductive polymers of the above applications tend to be brittle, resulting in inferior mechanical properties.

It would be desirable to blend the relatively brittle conducting polymer with a flexible polymer to form a blend having both the desired electrical properties and good flexibility.

To achieve high electrical conductivity the proportion of conductive polymer to non-conductive polymer in the blend must be relatively high (e.g., greater than 50%) in order for charge to be transferred effectively between polymer chains. Unfortunately, at high polyaniline loadings, the blend materials tend to phase separate, that is, the polyaniline aggregates into clumps within the non-conductive polymer matrix. These clumps are separated by the matrix material, and the blend thus is an insulator. Further, the mechanical properties of the material suffer upon phase separation. It would be desirable to form blends where the polyaniline is dispersed evenly on a molecular level at all loadings, to thus form a conductive polymer blend.

In the above U.S. application Ser. No. 158,478, of which the present application is a continuation-in-part, there is disclosed a conductive polymer blend formed by first reacting a base-type non-conductive polymer containing carbon-nitrogen linkages, such as polyaniline, with a carbonyl anhydride, such as 3,3',4,4'-benzophenone tetracarboxylic dianhydride, to form a conductive polymer containing polyimide-like groups covalently linked to nitrogen atoms of the base-type polymer, mixing such conductive polymer with non-conductive polyimide in a suitable solvent, removing the solvent, and forming a conductive continuous phase blend of the polyimide and the conductive polymer. However, unless the polyimide has a very low melt temperature, the conductive polymer-polyimide blends of the above application are not melt processible and are more useful for making conductive films or fibers than large parts, in which a meltable resin is necessary. In order for a conductive polyaniline to be melt processed or cured with another resin system, such polyaniline must be able to withstand the curing temperature of the other resin system.

In U.S. application Ser. No. 226,484, filed Aug. 1, 1988, by R. E. Cameron, and assigned to the same assignee as the present application, there is disclosed conductive multisulfonic acid derivatives of polyaniline which are highly thermally stable.

Examples of other conductive polymer mixtures are set forth in the following patents.

U.S. Pat. No. 4,526,706 to Upson, et al, discloses a conductive latex coating composition useful in forming conductive layers which comprises a latex having as a dispersed phase in water hydrophobic polymer particles having associated therewith a polyaniline salt semiconductor. The preferred polymer particles are polyurethane particles, but other polymer particles, such as various acrylate polymers, can be employed.

U.S. Pat. No. 3,766,117 to McQuade discloses a method of preparing an electrodepositable solution of a polyamic acid in an organic solvent, for use in electrodepositing a polyamic acid coating on an electrically conducting substrate. The method comprises preparing a solution of an aromatic polyamic acid in an organic solvent, adding to the polyamic acid solution a base, such as ammonia or an organic amine, e.g., an alkanolamine, and adding water to the base-modified polyamic solution to precipitate at least a portion of the polyamic acid to form a stable electrodepositable dispersion of polyamic acid. A coating of polyamic acid is then electrodeposited from the medium onto a conductive substrate, and the coating is then cured to a polyimide to form an insulation coating.

An object of the present invention is the provision of improved electrically conductive polymer materials of the class of conductive polyaniline blended with an imide other than the polyimides of the above U.S. application Ser. No. 158,478.

Another object is to provide conductive polymer materials having improved flexibility, mechanical properties, and thermal stability in the form of a continuous phase blend of a conductive polymer, e.g., conductive polyaniline, and a maleimide, which is capable of melt processing and is particularly applicable for production of large parts.

A still further object is to render imides, particularly bismaleimides, conductive by doping with a conductive polymer, such as conductive polyaniline, to produce an easily processable, highly thermally stable conductive polymer blend.

A still further object is to provide novel procedure for blending polyaniline in the solution phase with a maleimide such as bismaloimide, whereby on removal of the solvent, the resulting polymer blend can be processed to yield strong adhesive conductive resins.

SUMMARY OF THE INVENTION

The above objects are achieved and a conductive polymer blend is produced according to the invention by solution blending in a suitable solvent a mixture of (a) an electrically conductive polymor containing carbon-nitrogen linkages, particularly a conductive polyaniline or a polyaniline derivative, and (b) a maleimide, particularly a bismaleimide, removing the solvent, and forming a continuous phase blend of the conductive polymer and the maleimide, as by heating to cure the maleimide.

The invention is carried out by first reacting a base-type non-conductive polymer containing carbon-nitrogen linkages, particularly from the family of the polyanilines, with a cation donor compound capable of covalently binding to the nitrogens of the polymer, such as a carbonyl or sulfonyl anhydride, to thereby form an electrically conductive polymor, e.g., a derivatized polyaniline having an organic or inorganic group covalently linked to nitrogen atoms of the base-type polymer, e.g., as described in the above U. S. application Ser. No. 158,477 of S. I. Yaniger, et al.

The conductive polymer so formed is mixed with a maleimide, particularly a bismaleimide, e.g., in certain ranges of proportions as described hereinafter, in a suitable solvent, such as N-methyl pyrrolidone (NMP), to form a melt processable blend of the two components in the solution phase. Upon removal of the solvent, the mixture forms a continuous phase blend, the blended materials resulting in an electrically conductive resin which is strong and can be used as the matrix material in a non-metallic conductive composite, e.g., for fabrication of large parts, such as aircraft components. The blends of the present application are thermosetting in that they melt and cure to an insoluble part.

Another important advantage of the conductive polyaniline blends of the present application is that the bismaleimide thereof cures without giving off volatiles and without decomposing the polyaniline, whereas the curing of the polyimide in the conductive polyaniline-polyimide blends of above U.S. application Ser. No. 158,478 evolves volatiles.

If desired, in the above procedure, the electrically conductive polymer, e.g., conductive polyaniline, can be formed in situ, during solution blending with the maleimide component, by incorporating in the solvent solution the non-conductive polymer, e.g., polyaniline, and the cation donor compound for reaction with such non-conductive polymer, to form the resulting conductive polymer, in solution with the maleimide component.

Thus, the present invention discloses a technique for increasing the electrical conductivity of a maleimide, particularly bismaleimide, without materially adversely affecting, or without decreasing, the mechanical properties thereof.

DETAILED DESCRIPTION OF THE INVENTION AND PREFERRED EMBODIMENTS

Conductive Polymer Component

In preferred practice, a base-type non-conductive polymer containing carbon-nitrogen linkages is first reacted with a cation donor compound to form a polymer salt in which a covalent bond is formed between the nitrogens of the polymer and such donor cation.

A preferred form of non-conductive polymer can be represented as follows:

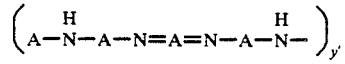

where A is a carbon-containing group, such as aryl, particularly the benzene ring, as in polyaniline, and including naphthyl and biphenyl, and substituted benzene, naphthyl or biphenyl groups, such as the alkyl substituted derivatives, e.g., 2-methyl biphenyl, butyl naphthalene, 2-methyl aniline, and aryl substituted derivatives, e.g., beta phenyl naphthalene and beta tolyl naphthalene; and y is an integer ranging from about 1 to about 1,000, e.g., about 10 to about 100.

Thus, the above non-conductive polyaniline family of polymers can be further characterized as consisting of polyaniline, its naphthyl and biphenyl derivatives, and alkyl and aryl substituted polyaniline and its alkyl and aryl substituted naphthyl and biphenyl derivatives.

The preferred non-conductive polymer containing carbon-nitrogen linkages is the basic polymeric starting material, polyaniline emeraldine free-base (PFB).

Other polymeric starting materials can include other non-conductive base-type polymers containing carbon atoms linked to nitrogen, such as cyanogen polymer containing the recurring unit:

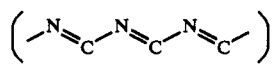

The starting materials of the invention can also include non-conductive mixtures and blends of the above polymers, and copolymers of the above polymers and other polymers, such as a blend of polyaniline and polymethylmethacrylate, and polymer alloys, such as polybenzimidazole-polyimide alloys, containing carbon-nitrogen groups.

Thus, the term "non-conductive polymer" as employed herein is intended to denote any of the above homopolymer or copolymer materials.

The invention will be described hereinafter, however mostly in terms of the use of the preferred non-conductive free-base polyaniline as polymeric starting material. This is a high polymer having a molecular weight of the order of 50,000 to 80,000. Lower molecular weight forms of polyaniline can also be employed, such as an oligomer of polyaniline containing 8 sub-units and having a molecular weight of about 800 to 900.

The non-conductive polymer e.g.. polyaniline, can be reacted with any dopant which is effective to increase the electrical conductivity of the polymer. Thus, for example, the free-base polyaniline can be reacted with protonic acids, such as HX, where X is a halogen, such as Cl, to convert the insulator to a conductor, as disclosed in the above MacDiarmid reference.

However, the preferred conductive polymers are those prepared by reacting the non-conductive polymer containing carbon-nitrogen linkages, such as polyaniline, with a cation donor compound capable of covalently binding to the nitrogens of such polymer to form an electrically conductive polymer. Thus, the resulting conductive polymer has an organic or inorganic group covalently linked to nitrogen atoms of the polymer and an anion associated with such nitrogen atoms to form a polymer salt.

Such conductive polymers and their method of formation are described in the above-noted applications. Thus, for example, the free-base polyaniline can be treated and reacted with an R+donor compound, such as RX, $R_3OX$, $R_2SO_4$, $R'SO_2Cl$, or $R_3''SiQ$, where R, $R'SO_2$ or $R_3''Si$ is a group which readily forms a covalent bond with nitrogen, and wherein R, R' and R'' each can be alkyl containing from 1 to 20 carbon atoms, e.g., methyl, ethyl and the like, and aryl, e.g., p-toluene sulfonyl (tosyl), benzyl, tolyl, xylyl, and other aromatic moieties, and X is an anion such as halogen, e.g., $Cl^-$, $I^-$ or $Br^-$; $PF_6^-$, $SbCl_6^-$, and substituted and unsubstituted benzene sulfonate, and the like, and Q is a halogen, such as Cl. The above reaction forms a conductive polymer salt.

Thus, the reactant which forms a covalent chemical bond with the nitrogen of the polyaniline free-base or equivalent polymer noted above, can be, for example, one of the above R+donor compounds, such as an alkyl halide, wherein the alkyl group can contain from 1 to 20 carbon atoms, such as methyl iodide, or dimethylsulfate.

The reaction for converting the base-type non-conductive polymer to a conductive polymer can be represented as follows, where, for example, RX is the R+donor compound:

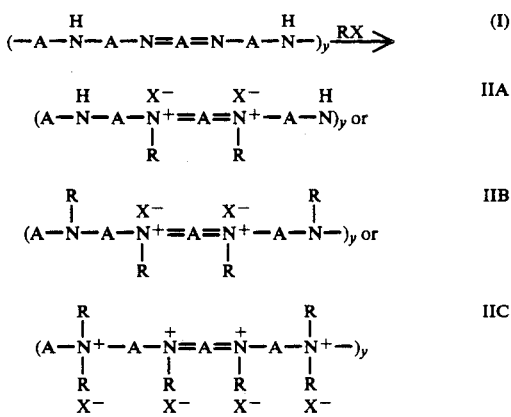

where A and y are as defined above.

According to another preferred embodiment, as disclosed in the above U.S. application Ser. No. 158,477, base-type non-conductive polymers containing carbon-nitrogen linkages, particularly from the family of polyaniline, can be converted to conductive polymers by reacting the non-conductive polymer with an anhydride, such as $R-SO_2-O-SO_2R'$, $R-CO-O-CO-R'$, or $R-CO-O-SO_2R'$, or mixtures thereof, where R and R' are alky or aryl, e.g., tosylic anhydride, benzophenone tetracarboxylic dianhydride, or o-sulfobenzoic anhydride, according to the general reaction shown above, and forming an electrically conductive polymer in which the $So_2R$ and COR groups are covalently linked to the nitrogen atoms of the conductive polymer and the anion of the conductive polymer is the $SO_3R'$ or $O_2CR'$ group.

According to still another preferred embodiment as disclosed in above U.S. application Ser. No. 226,484, filed Aug. 1, 1988, by R. E. Cameron, base-type non-conductive polymers containing carbon-nitrogen linkages, particularly from the family of polyaniline, are converted to conductive polymers of high thermal stability, by reacting the non-conductive polymer with a multiprotic acid in the form of an aromatic multisulfonic acid, e.g., having the formula $R(SO_3H)_n$, where R is aryl, such as benzene or naphthalene, or their substituted derivatives, and n is an integer of at least 2, preferably 2 to 4, or mixtures thereof, such as m-benzene disulfonic acid, to form a polymer salt in which the $-SO_3H$ groups are covalently linked to the nitrogens of the polymer through thc hydrogen bond.

The molar proportions of cation donor compound to non-conductive, e.g., nitrogen-containing polymer free-base, can be varied but is sufficient to increase the electrical conductivity of the polymer. Thus, for example, in the case of the above donor compounds RX, $R_3OX$, R₂SO₄, R'SO₂Cl and R₃₄₁SiQ and the anhydrides, the molar proportions of donor compound to nitrogen-containing polymer can range from about 0.01 to about 2 cation groups, e.g., SO₂R+ or COR+ groups in the case of the anhydride, per nitrogen, and in the case of polyaniline, such molar proportions can range from about 0.01 to about 8, per polymer repeat unit. Where an aromatic multisulfonic acid is employed as cation donor compound, a range of proportions of about 1/16 to about 2 moles of multisulfonic acid per nitrogen of each polymer unit is employed and, i the case of

Maleimide Component

The maleimide component which is blended with the above conductive polymer according to the invention can have a single terminal maleimide unit but is preferably a bismaleimide capped at opposite ends of the molecule with a maleimide unit. The maleimide component can be in the form of a monomer or an oligomer, preferably a bismaleimide terminated oligomer.

Examples of maleimide components which can be employed according to the invention are as follows:

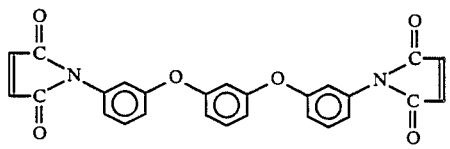

III

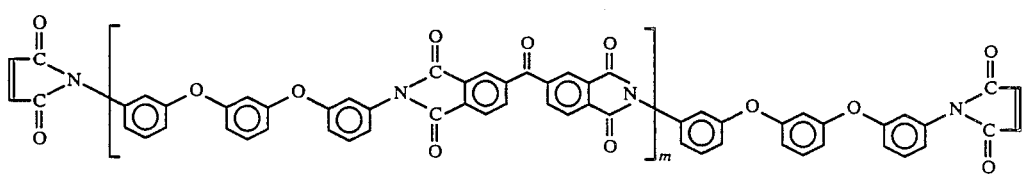

IV

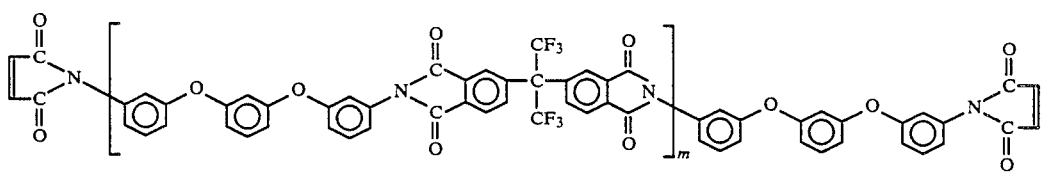

V polyaniline, from about ⅛ to about 2 moles of multisulfonic acid, for every 2 aniline units in the polyaniline chain.

The reaction can be carried out as a heterogeneous reaction wherein the polymer starting material is not dissolved but is reacted directly with the cation donor compound, e.g., anhydride, or the polymer starting material, such as polyaniline non-conductive free-base, can be dissolved in a suitable solvent which does not react irreversibly with such donor compound, e.g., N-methyl pyrrolidone, dimethylsulfoxide (DMSO), dimethylformamide (DMF), formic acid, dimethylacetamide (DMAC), acetonitrile, tetrahydrofuran (THF), and pyridine.

The reaction is generally carried out at about ambient or room temperature, e.g., 20°-25° C., or at higher or lower temperatures.

The rate of reaction can range widely, depending on the particular cation donor compound reactant employed. Thus, the reaction rate can range from almost instantaneous to several hours or longer.

The conductivity of the resulting conductive polymers, e.g., conductive polyaniline, can be varied by reducing or increasing the number of covalently linked side chains on the nitrogen atoms, as by controlling the degree of completeness of the reaction and/or by varying the types of cation donor compound employed in producing such side chains on the polymer.

The disclosures of the above applications and the MacDiarmid reference are incorporated herein by reference with respect to the conductive polymer component of the present invention and its method of preparation.

where m is an integer of from 1 to about 10, preferably 1 to about 4.

The BMI (bismaleimide) of formula III is known and can be made by reacting 1,3 bis (3-aminophenoxybenzene (APB)) and two units of MI (maleimide).

The BMI of formula IV is known and can be made by reacting 10 units of APB and 10 units of benzophenonetetracarboxylic dianhydride (BTDA) capped by 2 units of MI.

The BMI of formula V can be made in known manner by reacting 10 units of APB and 10 units of the anhydride marketed as 6FDA and having the formula:

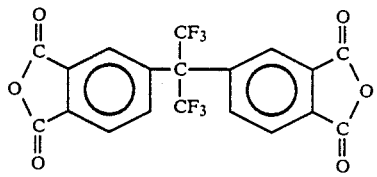

capped by 2 units of MI.

Examples of additional BMI's are as follows:

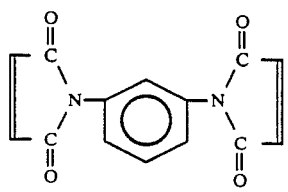

VI

-continued

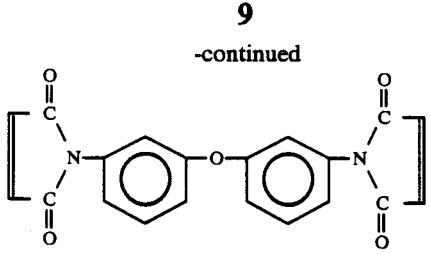

VII

The conductive polymer can be blended in a wide range of proportions with non-conductive maleimide component, generally ranging from about 1 to about 99% conductive polymer to 1 to about 99% non-conductive maleimide component, e.g., bismaleimide, by weight of the mixture. The blend forming the conductive film is the same as that noted above in preparing the solutions of the blends. The blended polymer also has the good mechanical properties of the maleimide component while having the good electrical conductivity properties of the conductive base-type polymer, such as conductive polyaniline. The continuous single-phase blends of the conductive polymer and non-conductive maleimide component produced according to the invention do not separate out upon forming a film from the blend Further, upon removal of solvent, the resulting polymer blend can be melt processed to yield strong adhesive resins.

Instead of forming a blend of the two components and the blend used to form a coating, the conductive polymer and maleimide component blend can be processed to a powder. This can be achieved, e.g., by blending the non-conductive polymer, e.g., polyaniline, in solvent solution, e.g., NMP, with maleimide component, particularly bismaleimide, and adding a cation donor compound, such as benzene disulfonic acid for reaction with the polyaniline to form conductive polymer. The resulting blend of both components is precipitated out of solution by adding a precipitating agent, such as hexane, toluene, or a mixture thereof, to the solution blend. The precipitate can be filtered, and the resulting powder can be pressed or molded into a thermoset part and cured of elevated temperature.

EXAMPLE 1

10 grams of PA (polyaniline) emeraldine free-base is dissolved into 250 ml of NMP. To this solution is added 10 grams of the BMI of formula III above. 6.5 grams of m-benzene disulfonic acid is added to the resulting solution. The solution turns green. This solution contains about 50% of conductive PA and about 50% of the BMI, by weight of the mixture.

The NMP is evaporated from the resulting solution or blend, and a film is cast from the resulting conductive PA and BMI blend on a glass substrate. The resulting film is heated at 180° C. in air for 3 hours. The cured film is electrically conductive and strong.

EXAMPLE 2

The solution or blend of conductive PA and BMI is formed as in Example 1. Such solution is added dropwise to 500 ml of a 50—50 mixture of hexane-toluene.

A green precipitate is formed, which is filtered from the reaction mixture. The filtered precipitate is washed with excess hexane. The resulting dry powder can then be pressed into pellets or parts. Such compressed pellets or parts are cured by heating in air, argon or nitrogen at 180° C. for 4 hours. Since the BMI melts prior to curing at 180° C., the resulting electrically conductive parts have good mechanical properties.

The table below shows the relationship between time of curing and conductivity, for curing of the compressed pellets.

TABLE

| TIME OF CURING (HOURS) | ELECTRICAL CONDUCTIVITY (S/cm) |
|---|---|
| 0 | $10^{-1}$ |
| 1 | $10^{-2}$ |
| 2 | $10^{-2.5}$ |
| 3¼ | $10^{-2.5}$ |

The above table shows that there is an initial decrease in conductivity during the first 2 hours of curing, but once the material has cured, e.g., after about 3 hours, there is no longer any further drop in electrical conductivity, as shown by the same value of conductivity for 3¼ hours of curing as for 2 hours of curing. This shows that although there is an initial drop in electrical conductivity of the resin blend, e.g., due to binding of the BMI to the polyaniline amine groups, following curing, the cured resin is still conductive and the electrical conductivity remains constant. This indicates that the conductive polyaniline of the blend does not decompose during or after curing.

If a higher electrical conductivity for the cured resin blend is desired, a larger proportion of the conductive polyaniline polymer is employed in the blend of conductive polymer and BMI, e.g., 75% conductive polyaniline and 25% BMI, by weight of the mixture.

EXAMPLE 3

The procedure of Example 1 is followed except employing o-sulfobenzoic anhydride or p-toluenesulfonic anhydride, respectively, in place of m-benzene disulfonic acid and in the same amount as the latter cation donor compound for the PA.

Results similar to Example 1 are obtained.

EXAMPLE 4

The procedure of Example 1 is carried out using isopropyl iodide or $CH_3C_6H_4SO_2Cl$, respectively, as cation donor compound for the PA in place of m-benzene disulfonic acid, and in the same amount thereof.

Results similar to Example 1 are obtained.

EXAMPLE 5

The procedure of Example 1 is followed except employing dimethyl sulfate in the same amount as the m-benzene disulfonic acid.

Results similar to Example 1 are obtained.

EXAMPLE 6

The procedure of Example 1 is carried out except using the hydrogen ion form of Nafion, a multisulfonic acid derivative of perfluorinated polymer, marketed by DuPont, instead of m-benzene disulfonic acid and in the same amount.

Results similar to Example 1 obtained.

EXAMPLE 7

The procedure of Example 1 is carried out, except using the BMI of formula IV above and in the same amount as the BMI of formula III.

Results similar to Example I are obtained.

EXAMPLE 8

The procedure of Example 1 is carried out, except using the BMI of formula V above and in the same amount as the BMI of formula III.

Results similar to Example I are obtained.

EXAMPLE 9

The procedure of Example 1 is repeated, except using 5 grams of PA free-base and 15 grams of the BMI component to form a solution blend containing about 25% of conductive PA and about 75% of the BMI, by weight of the mixture.

The electrically conductive polymer blends of the invention have utility in the production of conductive composites, electronic components, electrical conductors, electrodes, batteries, switches, electrical shielding material, resistors, capacitors, and the like.

From the foregoing, it is seen that the invention provides a novel class of conductive polymer materials which can be readily cast into tough, flexible conductive films, by solution blending conductive, preferably nitrogen-containing, polymers, such as conductive polyaniline, with a maleimide component, particularly a bismaleimide. The resulting resin blend increases the electrical conductivity of the maleimide component without decreasing its mechanical integrity. The result is a conductive resin of superior strength, toughness, flexibility and processibility. Due to the melting followed by curing of the BMI when blended with the conductive polyaniline, the conductive blend can be melted and cured without the evolution of volatiles. No polyaniline decomposition is seen with these materials.

While particular embodiments of the invention have been described for purposes of illustration, it will be understood that various changes and modifications within the spirit of the invention can be made, and the invention is not to be taken as limited except by the scope of the appended claims.

We claim:

1. The process for producing a conductive polymer blend which comprises:
   solution blending in a suitable solvent a mixture of (a) a conductive polymer containing carbon-nitrogen linkages selected from the group consisting of conductive polyaniline, its naphthyl and biphenyl derivatives, and alkyl and aryl substituted polyaniline and its alkyl and aryl substituted naphthyl and biphenyl derivatives, and (b) a maleimide,
   removing said solvent, and
   forming a conductive continuous phase blend of said conductive polymer and said maleimide.

2. The process of claim 1, said conductive polymer having an organic or inorganic group covalently linked to nitrogen atoms of said polymer.

3. The process of claim 1, wherein said conductive polymer has an organic group derived from an anhydride or an aromatic multisulfonic acid covalently linked to the nitrogen atoms of said polymer.

4. The process of claim 1, wherein said conductive polymer is polyaniline and said conductive polyaniline has an organic group derived from an anhydride or an aromatic multisulfonic acid covalently linked to the nitrogen atoms of said polyaniline.

5. The process of claim 1, wherein said maleimide is a bismaleimide or a bismaleimide terminated oligomer.

6. The process of claim 4, wherein said maleimide is a bismaleimide terminated oligomer, employing about 1 to about 99% of said conductive polymer and about 1 to about 99% of said maleimide, by weight of the mixture.

7. The process of claim 1, including heating said continuous phase blend and curing said maleimide.

8. A process for producing a conductive polymer blend which comprises:
   reacting a base-type non-conductive polymer containing carbon-nitrogen linkages selected from the group consisting of polyaniline, its naphthyl and biphenyl derivatives, and alkyl and aryl substituted polyaniline and its alkyl and aryl substituted naphthyl and biphenyl derivatives, with a compound capable of converting said non-conductive polymer to a conductive polymer, and forming said conductive polymer having an organic or inorganic group covalently linked to nitrogen atoms of said polymer,
   solution blending a maleimide with said conductive polymer in a suitable solvent,
   removing said solvent, and
   forming a conductive continuous phase blend of said conductive polymer and said maleimide.

9. The process of claim 8, wherein said reaction to form said conductive polymer is carried out in situ during solution blending with said maleimide.

10. The process of claim 8, wherein said maleimide is a bismaleimide or a bismaleimide terminated oligomer.

11. The process of claim 8, wherein said compound is a carbonyl anhydride or a sulfonyl anhydride, and forming anhydride groups covalently linked to nitrogen atoms of said polymer.

12. The process of claim 8, wherein said compound is an aromatic multisulfonic acid.

13. The process of claim 8, wherein said compound is selected from the group consisting of RX, $R_3OX$, $R_2SO_4$, $R'SO_2Cl$ and $R_3''SiQ$, where R, $R'SO_2$ or $R_3''Si$ is a group which forms a covalent bond with nitrogen and wherein R, R' and R'' is alkyl containing from 1 to 20 carbon atoms or aryl, and Q is a halogen.

14. The process of claim 8, employing about 1 to about 99% of said conductive polymer and about 1 to about 99% of said maleimide, by weight of the mixture.

15. The process of claim 14, wherein said polymer is polyaniline and said maleimide is bismaleimide or a bismaleimide terminated oligomer.

16. The process of claim 15, wherein said compound is a carbonyl anhydride or a sulfonyl anhydride, and forming anhydride groups covalently linked to nitrogen atoms of said polymer, and including heating said continuous phase blend.

17. The process of claim 15, wherein said compound is an aromatic multisulfonic acid, and forming $-SO_3H$ groups covalently linked to nitrogen atoms of said polymer through the hydrogen bond on the nitrogen atoms, and including heating said continuous phase blend.

18. A blend of (a) a conductive polymer containing carbon-nitrogen linkages, said conductive polymer selected from the group consisting of conductive polyaniline, its naphthyl and biphenyl derivatives, and alkyl and aryl substituted polyaniline and its alkyl and aryl substituted naphthyl and biphenyl derivatives, and (b) a maleimide, in a suitable solvent.

19. The blend of claim 18, wherein said conductive polymer is derived from a polymer having the formula:

where A is aryl and y is an integer of from about 1 to about 1,000.

20. The blend of claim 18, employing about 1 to about 99% of said conductive polymer and about 1 to about 99% of said maleimide, by weight of the mixture.

21. The blend of claim 18, said conductive polymer having an organic or inorganic group covalently linked to nitrogen atoms of said polymer.

22. The blend of claim 18, wherein said conductive polymer is conductive polyaniline, and said conductive polyaniline has an organic group derived from an anhydride or an organic multisulfonic acid covalently linked to the nitrogen atoms of said polyaniline.

23. The blend of claim 18, wherein said maleimide is a bismaleimide or a bismaleimide terminated oligomer.

24. The blend of claim 22, wherein said maleimide is a bismaleimide or a bismaleimide terminated oligomer, employing about 1 to about 99% of said conductive polymer and about 1 to about 99% of said maleimide, by weight of the mixture.

25. An electrically conductive solid polymer material, comprising a continuous phase blend of (a) a conductive polymer containing carbon-nitrogen linkages selected from the group consisting of conductive polyaniline, its naphthyl and biphenyl derivatives, and alkyl and aryl substituted polyaniline and its alkyl and aryl substituted naphthyl and biphenyl derivatives, said conductive polymer having an organic or inorganic group covalently linked to nitrogen atoms of said polymer, and (b) a maleimide, said polymer material containing about 1 to about 99% of said conductive polymer and about 1 to about 99% of said maleimide, by weight.

26. The electrically conductive polymer material of claim 25, wherein said conductive polymer has an organic group derived from an anhydride or an aromatic multisulfonic acid covalently linked to the nitrogen atoms of said polymer.

27. The electrically conductive polymer material of claim 25, wherein said polymer is polyaniline, and said conductive polyaniline has an organic group derived from a multisulfonic acid covalently linked to the nitrogen atoms of said polyaniline.

28. The electrically conductive polymer material of claim 25, wherein said polymer is polyaniline, and said conductive polyaniline has an organic group selected from the class consisting of R, R'SO$_2$ and R$_3$"Si covalently linked to the nitrogen atoms of said polyaniline, where R, R' and R" is alkyl or aryl.

29. The electrically conductive polymer material of claim 25, wherein said maleimide is a bismaleimide or a bismaleimide terminated oligomer.

30. The electrically conductive polymer material of claim 27, wherein said maleimide is a bismaleimide or a bismaleimide terminated oligomer.

31. The electrically conductive polymer material of claim 27, wherein said maleimide is a compound selected from the group having the following formulae:

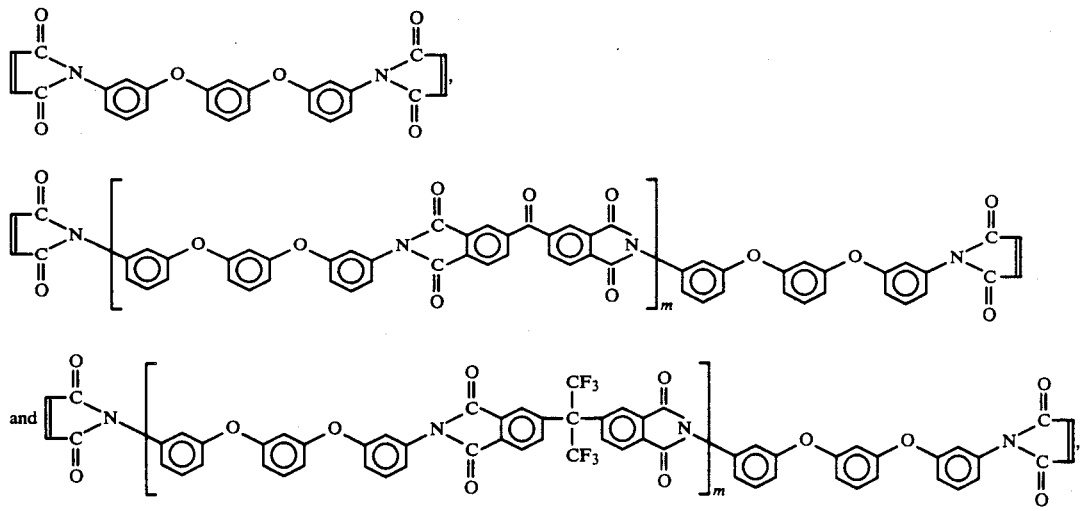

where m is an integer of from 1 to about 10.

32. The electrically conductive polymer material of claim 27, wherein said maleimide is a compound selected from the group having the following formulae:

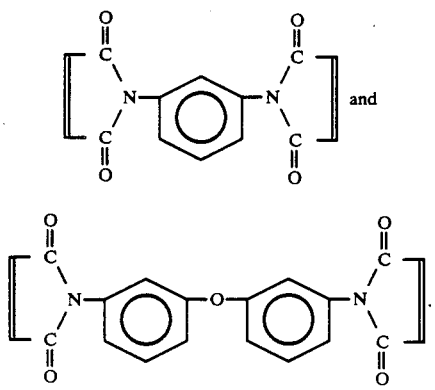

* * * * *